United States Patent
Kim

(10) Patent No.: US 7,505,777 B2
(45) Date of Patent: Mar. 17, 2009

(54) SYSTEM AND METHOD FOR SENDING INTERNET MESSAGE IN MOBILE COMMUNICATION TERMINAL

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 433 days.

(21) Appl. No.: 11/258,926

(22) Filed: Oct. 27, 2005

(65) Prior Publication Data
US 2006/0094454 A1 May 4, 2006

(30) Foreign Application Priority Data
Oct. 28, 2004 (JP) .................. 10-2004-0086852

(51) Int. Cl.
*H04Q 7/20* (2006.01)
(52) U.S. Cl. ............... 455/466; 455/412.1; 455/412.2; 455/414.1; 455/418; 455/41.2; 455/41.3; 455/556.1; 370/338; 709/204; 709/217
(58) Field of Classification Search ........ 455/41.2, 455/41.3, 412.1, 412.2, 414.1, 418, 556.1; 370/338; 709/204, 217
See application file for complete search history.

(56) References Cited

U.S. PATENT DOCUMENTS 6,463,462 B1 * 10/2002 Smith et al. ............... 709/206
7,136,462 B2 * 11/2006 Pelaez et al. ............. 379/88.14
2002/0047868 A1 * 4/2002 Miyazawa .................. 345/835

FOREIGN PATENT DOCUMENTS

| EP | 1 091 601 A2 | 4/2001 |
|----|----|----|
| EP | 1 091 601 A3 | 4/2001 |
| EP | 1 146 701 A1 | 10/2001 |
| EP | 1091601 | * 11/2001 |
| EP | 1 199 856 A2 | 4/2002 |
| EP | 1 557 989 A1 | 7/2005 |
| EP | 1 653 401 A1 | 5/2006 |
| JP | 10-107836 A | 4/1998 |
| JP | 2002-132647 | 5/2002 |
| KR | 10-2001-0064374 A | 7/2001 |

OTHER PUBLICATIONS

"SMS Changes the Business," Mobile Media Magazine, vol. 6 No. 12, Nov. 13, 1998, 17-24.

* cited by examiner

*Primary Examiner*—Stephen M D'Agosta
(74) *Attorney, Agent, or Firm*—Birch, Stewart, Kolasch & Birch, LLP

(57) ABSTRACT

A method and system for sending and posting a message in a mobile communication environment, are discussed. In one embodiment, the system for positing a message includes a first terminal configured to send a message with a destination number and message access level information, and a server configured to post the message to a website corresponding to the destination number based on the message access level information.

9 Claims, 3 Drawing Sheets

SYSTEM AND METHOD FOR SENDING INTERNET MESSAGE IN MOBILE COMMUNICATION TERMINAL

This application claims under 35 U.S.C. §119 the priority benefit of Korean Patent Application No. 10-2004-0086852 filed in Republic of Korea on Oct. 28, 2004, the entire content of which are hereby incorporated by reference.

BACKGROUND OF THE INVENTION

1. Field of the Invention

The present invention relates to a method and system for sending a message in a mobile communication system, and particularly, to a method and system for generating and posting a message to a network site such as an Internet website.

2. Description of the Background Art

With rapid development and spread of a mobile communication technology, not only can messages be sent between mobile terminals but also using a mobile terminal, an Internet mail can be checked or messages can be sent to an Internet site (e.g., homepage). Hereinafter, a message being received and sent between a mobile terminal and an Internet site is called an Internet message for the purpose of simplicity.

FIG. 1 is a view illustrating a method of sending an Internet message in accordance with a background art.

As illustrated in FIG. 1, in order to send a message to an Internet site, a subscriber selects an 'Internet connection' menu on a mobile communications terminal (S10). The subscriber then inputs a URL (Uniform Resource Locator) address of an Internet homepage to which the subscriber intends to connect (S20), and attempts to connect to the Internet homepage (S30).

When the subscriber is connected to the Internet homepage, the subscriber moves to a bulletin board or a guest book of that homepage and writes a message using the subscriber's mobile communications terminal (S40 and S50). Then, if the subscriber completes writing the message, the subscriber releases the connection to the Internet homepage (S60), thereby completing the process of writing and sending a message.

The method of sending a message according to the background art, however, has a number of problems and limitations. For example, it requires relatively high cost because the Internet connection must be maintained until the subscriber completes writing the message. Further, it causes inconvenience to the subscriber since the subscribe must input a full URL address. It also has a disadvantage in that the subscriber cannot visit a bulletin board (or a guest book) of a corresponding homepage if the subscriber does not know the exact URL address of the Internet homepage that the subscriber would like to visit. In addition, since a general mobile communications terminal has limited hardware resources unlike a general personal computer, Internet sites the subscriber can visit are limited.

SUMMARY OF THE INVENTION

Therefore, an object of the present invention is to provide a method for sending an Internet message in a mobile communication system by which a message is sent to an Internet site using a telephone number of a receiving side.

Another object of the present invention is to provide a mobile terminal and a method and system for transmitting and posting an Internet message using the mobile terminal, which overcome the limitations and disadvantages associated with the background art.

To achieve these and other advantages and in accordance with the purpose of the present invention, as embodied and broadly described herein, there is provided according to an embodiment a system for posting a message in a mobile communication environment, the system comprising: a first terminal configured to send a message with a destination number and message access level information; and a server configured to post the message to a website corresponding to the destination number based on the message access level information.

According to another aspect of the present invention, there is provided a method of posting a message in a mobile communication system, the method comprising: sending, by a first terminal, a message with a destination number and message access level information; and post the message to a website corresponding to the destination number based on the message access level information.

According to another aspect of the present invention, there is provided a system for sending a message in a mobile communication environment, the system comprising: a mobile terminal configured to send a message and a destination number associated with the message; and a server configured to receive the message and send the received message to an Internet server corresponding to the destination number.

According to another aspect of the present invention, there is provided a method for sending a message in a mobile communications system, the method comprising: sending a message of a mobile terminal to a server along with a destination number associated with the message; and transmitting the message from the server to an Internet server corresponding to the destination number.

According to another aspect of the present invention, there is provided a mobile terminal comprising: a processor configured to receive a content of a message to be posted and a number of another mobile terminal associated with posting of the message from a user, and to send the content of the message with the number of the another mobile terminal to a base station, so that the message can be posted on a website corresponding to the number of the another mobile terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
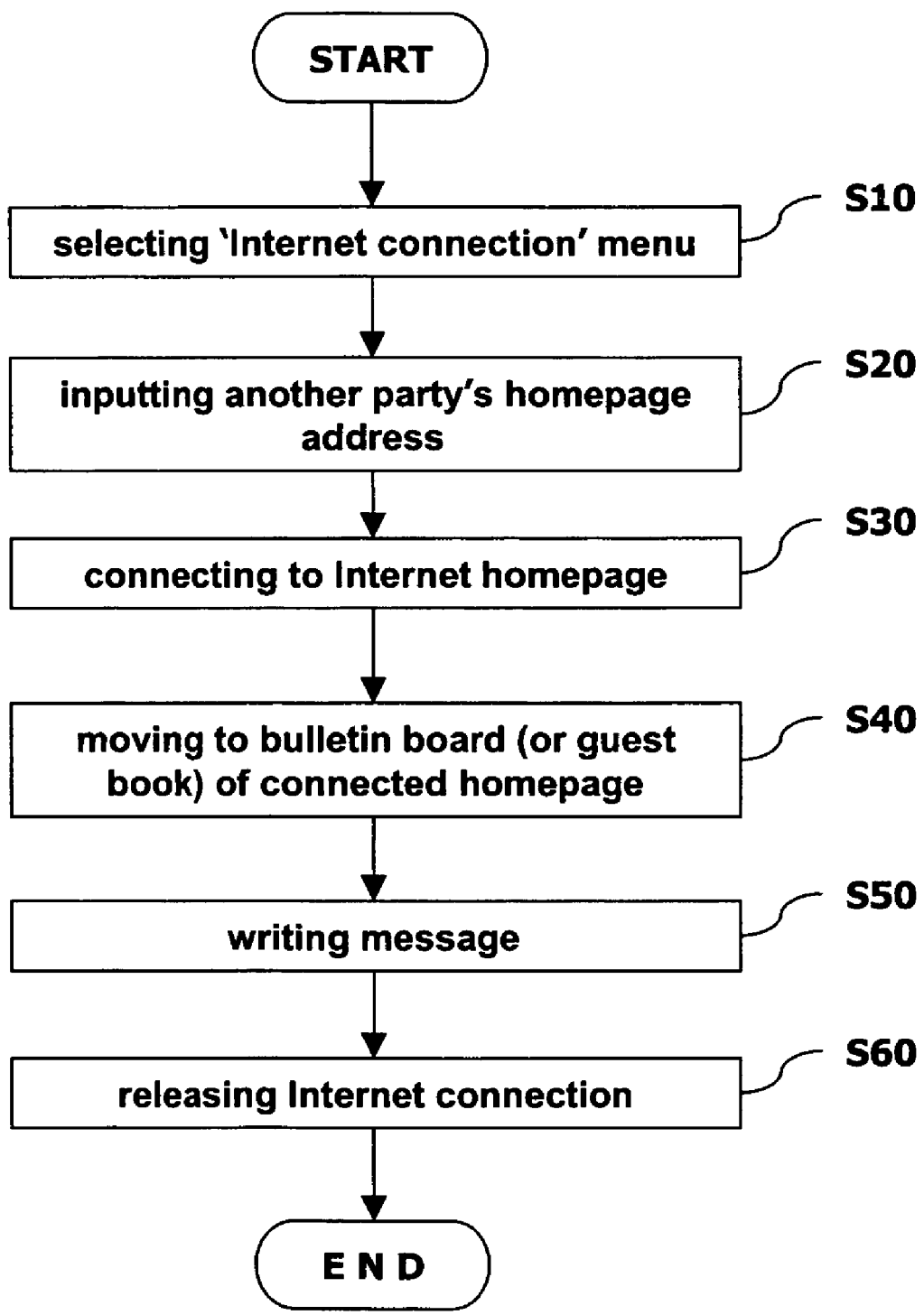
FIG. 1 is a view illustrating a method of sending an Internet message in accordance with a background art.
Figure 2:
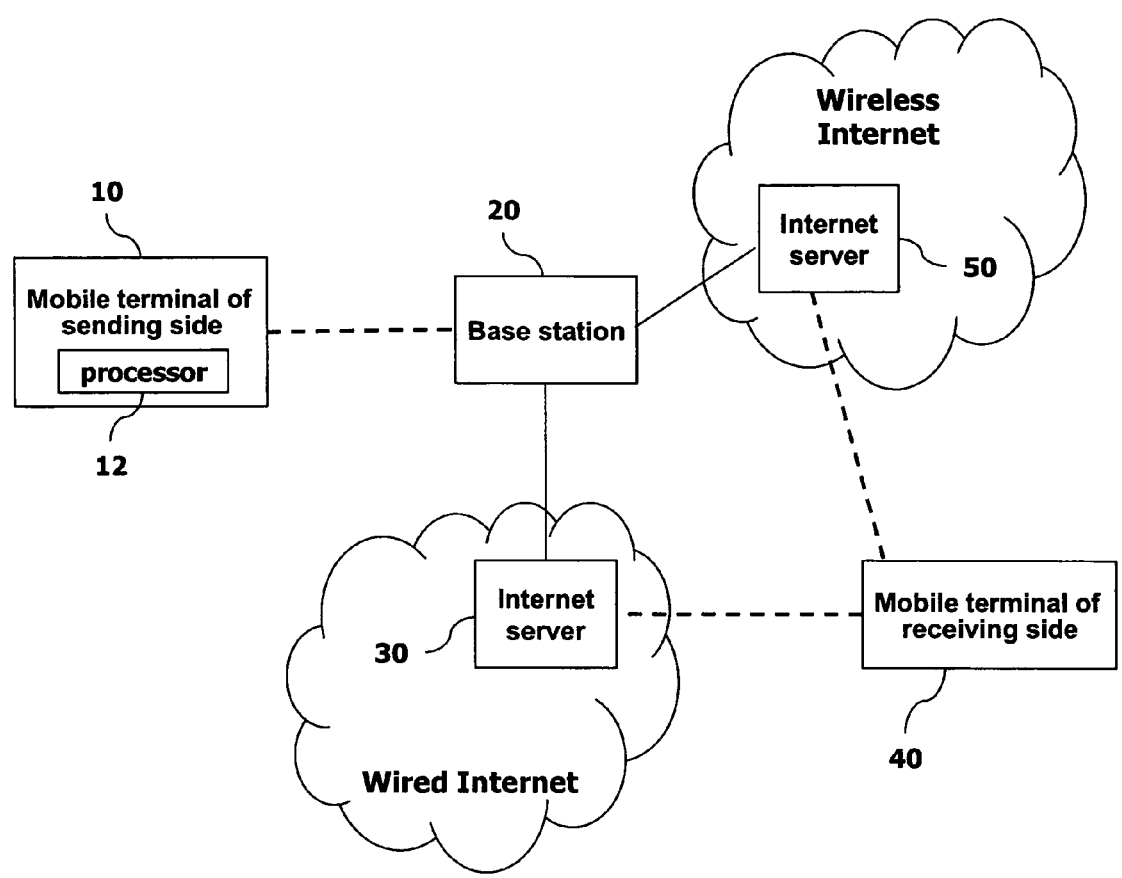
FIG. 2 is a view illustrating a mobile communication system in accordance with an embodiment of the present invention.

FIG. 2 is a view illustrating a mobile communication system in accordance with an embodiment of the present invention.

Referring to FIG. 2, the mobile communication system includes a mobile terminal 10 for setting a telephone number of a receiving side to a destination address of a message to be sent and sending the message to an Internet site, a base station (e.g., a server) 20 for receiving the message of the mobile terminal 10 and sending the received message to the Internet site corresponding to the telephone number of the receiving side through a wired or wireless network, and a network server such as an Internet server 30 or 50 for receiving the message from the base station 20 and posting the received message on its website, and setting a message access an authentication number having been received together with the message as a password of the posted message.

The Internet server 30 or 50 notifies a mobile terminal 40 of the receiving side that a new message has been posted when the Internet server 30 or 50 receives the message from the base station 20. All the components of the system in FIG. 2 are operatively coupled.

In an embodiment, the mobile terminal 10 includes a separate menu (e.g., "homepage send" menu) allowing a subscriber to write a message and send the written message to an arbitrary Internet site (e.g., homepage). If the 'homepage send' menu of the mobile terminal 10 is selected, an input window or screen to which a mobile terminal number of the owner of the destination home page, a message access authentication number (e.g., password) and a message to be left on the homepage can be input, can be displayed on a liquid crystal screen of the mobile terminal 10. The generation and management of such menus and windows can be done by a processor 12 of the mobile terminal 10.

Figure 3:
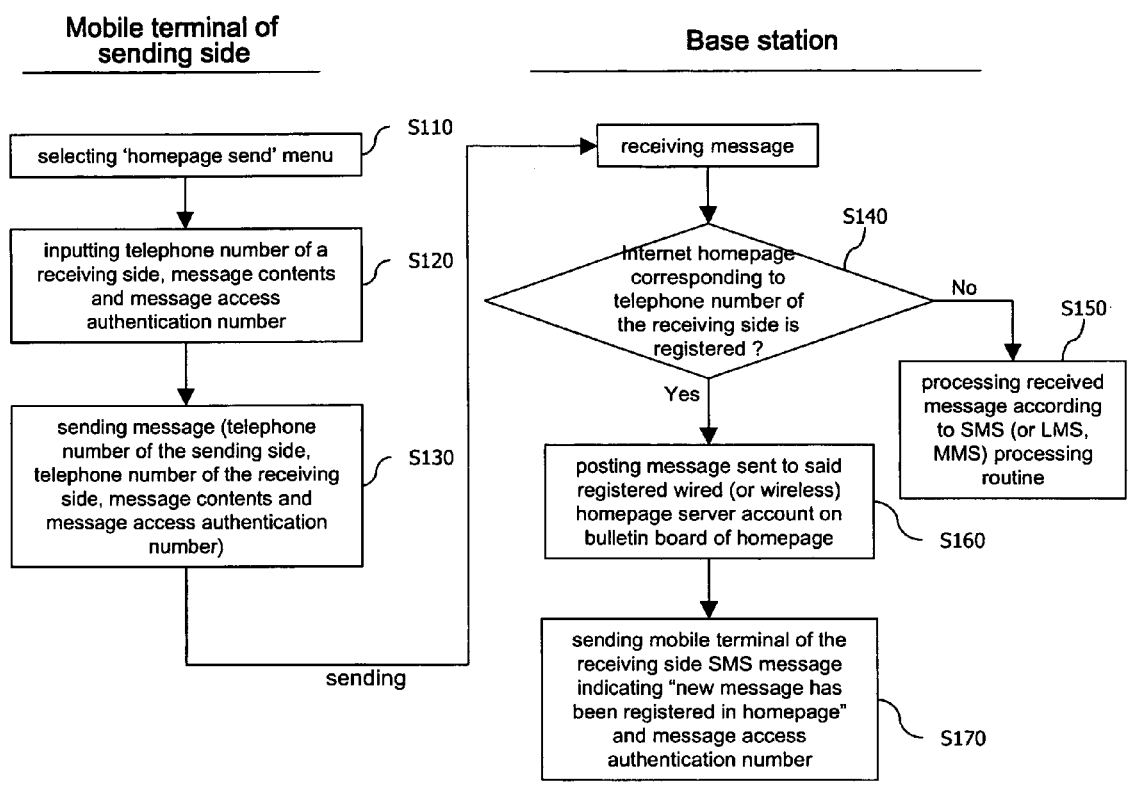
FIG. 3 is a view illustrating a method of sending an Internet message in accordance with an embodiment of the present invention.

FIG. 3 is a view illustrating a method of sending an Internet message in accordance with an embodiment of the present invention. The method is implemented in the system of FIG. 2, but can be implemented in other suitable system or device.

With reference to FIGS. 2 and 3, the method for sending a message in accordance with the present invention will be described in detail.

First, when a subscriber intends to register a message on an Internet site, e.g., a homepage of a person/entity for which that message intended (also referred to herein as a 'message recipient'), the subscriber selects a 'homepage send' menu (or the like) of the subscriber's mobile terminal 10 (S110). Then the subscriber inputs to the mobile terminal 10 a mobile terminal number (e.g., a mobile telephone number) of the message recipient (or selects a phone number from its address/telephone book) and then writes a message to be left on the homepage of the message recipient. The mobile terminal number of the message recipient is also referred to as a "telephone number of a receiving side".

If the subscriber completes writing the message into the mobile terminal 10, the subscriber inputs to the mobile terminal 10 an arbitrary or prescribed value as a message access authentication number, and sends the written message together with the subscriber's mobile terminal number (referred to herein as a "telephone number of a sending side"), the telephone number of the receiving side and the message access authentication number to the base station (20), e.g., by pressing a send key on the mobile terminal 10 (S120 and S130). The message access authentication number is for the security level (open or non-open (closed)) of the message. If the subscriber does not input a value for the message access authentication number, then the system sets the message access authentication number to a null value or an initial value (e.g., '0000'), and the security level of the message is set to 'open'. However, if the subscriber inputs a particular value as the message access authentication number, the security level of the message is set to 'closed'. Thus, only those who know the subscriber's input message access authentication number can read the message.

The base station 20 then receives the message including the telephone number of the sending side, the telephone number of the receiving side, and the message access authentication number from the subscriber's mobile terminal 10, and checks whether or not a wired Internet (or wireless Internet) homepage corresponding to the received telephone number of the receiving side is registered in a memory (S140). The memory can be a storage within in or external to the base station 20. Here, the Internet homepage corresponding to the telephone number of the receiving side can be registered, changed and/or deleted according to the subscriber's needs. In other words, subscribers can register, modify and delete website information associated with certain telephone numbers at the base station, and the base station utilizes this website information (e.g., homepage of a message recipient) to transmit a subscriber's message to the appropriate message recipient through the wired or wireless network such as the Internet.

If it is determined at step S140 that the homepage of the message recipient is not registered in the memory, then the base station 20 sends the message received from the mobile terminal 10 to a receiving side mobile terminal 40 (corresponding to the received telephone number of the receiving side) according to a general SMS (Short Message Service) processing routine (S150). The SMS processing routine may be an LMS (Learning Management System) processing routine and an MMS (Multi-media Messaging Service) processing routine known in the art.

On the other hand, if it is determined at step S140 that the homepage of the message recipient is registered in the memory, the base station 20 sends the telephone number of the sending side, the telephone number of the receiving side, the message contents and the message access authentication number contained in the received message to a registered homepage server account (S160). Then, a server 30 or 50 of the homepage (corresponding to the telephone number of the receiving side) posts the received message contents and telephone number of the sending side on a designated page such as a bulletin board (or a guest book) of the homepage, and sets the message access authentication number received together with the message as a password of the post (S160). As described above, if a null value or an initial value ('0000') is set as the message access authentication number of the message, any visitor is allowed to read the corresponding post. However, if a particular value is set to the message access authentication number, then only those who input the set value as the password can read the corresponding post.

Meanwhile, the homepage server 30 or 50 sends a notification message (SMS), e.g., 'a new message has been posted on the homepage', to the mobile terminal 40 of the receiving side. In addition or optionally, in order for the receiving side to read the corresponding post, the homepage server 30 or 50 also sends the message access authentication number (password) to the mobile terminal 40 of the receiving side (S170). According to an embodiment, the server 30 or 50 may be configured to not give out the password of the posted message if the message access authentication number has a null value. In one example, a user at the mobile terminal 40 or at a computer can access the posted message, e.g., via the Internet, using the password received from the server 30 or 50. In another example, if the sender and receiver of a message agree to a prescribed message access authentication number in advance, then the receiver can use the prescribed number as the password, and the server 30 or 50 may not necessarily send the message access authentication number to the mobile terminal 40. Thereafter, the posted message can be retrieved.

In the present invention, generation, transmission and posting of an Internet message have been discussed. However, the invention is not limited thereto, and the inventive concepts can be applied to other types of messages such as intranet messages, extranet messages, etc. Also, the mobile terminal in the present invention can be a mobile phone, a personal digital assistant (PDA), a pager, or other device capable of communicating with a base station and a network server.

In the method of sending a message according to the background art, a message can be left on a bulletin board (or a guest book) of another party's homepage only when the sender exactly knows the homepage URL address of the other party. However, the present invention allows connection to another party's homepage with only a telephone number of a receiving side. As a result, there is no need to know the exact URL address of the posting homepage and a sender can send an Internet message to a receiver by using a telephone number of the receiver's mobile terminal. Accordingly, an Internet message can be easily sent.

In addition, since a message is sent without maintaining a separate Internet connection, the present invention eliminates costs attributable to that Internet connection. Further, in spite of limitations in hardware resources that a mobile communications terminal may have, a message can be sent to (or posted on) most Internet sites.

In addition, the present invention allows a subscriber at the sending side to determine the subscriber's preferred security level (e.g., open or closed) of the message by allowing the subscriber to set an access authentication number in the message.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of wireless communication performed by a Base Station, comprising:
    receiving a message sent from a message origination wireless communication device, the message including a telephone number of a recipient wireless communication device, content data, and a password data configured to enable the recipient to access the protected message, the message not including web address information associated with the recipient wireless communication device telephone number;
    determining whether or not there exists a webpage associated with the recipient wireless communication device telephone number and capable of accepting messages for posting, and generating a determination result;
    posting the content data on the website based on the determination result, the step of posting including setting a password for the posted content data; and
    sending a notification to the recipient wireless communication device that the content data has been posted,
    the step of setting a password comprising setting the password to be equal to a number different than a telephone number of the message origination wireless communication device, and
    the step of sending a notification comprising sending the password as part of the notification.

2. The method of claim 1, the step of setting the password to be equal to a number different than a telephone number of the message origination wireless communication device comprising:
    retrieving the number from a memory.

3. The method of claim 1, further comprising:
    forwarding the content data to the recipient wireless communication device, without posting the content data on the website, based on the determination result.

4. A communication device configured to:
    receive a message sent from a message origination wireless communication device, the message including a telephone number of a recipient wireless communication device, content data, and a password data configured to enable the recipient to access the protected message, the message not including web address information associated with the recipient wireless communication device telephone number;
    determine whether or not there exists a webpage associated with the recipient wireless communication device telephone number and capable of accepting messages for posting, and generate a determination result;
    post the content data on the website based on the determination result;
    set a password for the posted content data;
    send a notification to the recipient wireless communication device that the content data has been posted;
    set the password to be equal to a number different than a telephone number of the message origination wireless communication device; and
    send the password as part of the notification.

5. The communication device of claim 4, further configured to:
    retrieve the number from a memory.

6. The communication device of claim 4, further configured to:
    forward the content data to the recipient wireless communication device, without posting the content data on the website, based on the determination result.

7. A system for wireless communication, comprising:
    a message origination wireless communication device;
    a recipient wireless communication device; and
    a communication device configured to:
        receive a message sent from the message origination wireless communication device, the message including a telephone number of the recipient wireless communication device, content data, and a password data configured to enable the recipient to access the protected message, the message not including web address information associated with the recipient wireless communication device telephone number;
        determine whether or not there exists a webpage associated with the recipient wireless communication device telephone number and capable of accepting messages for posting, and generate a determination result;
        post the content data on the website based on the determination result;
        set a password for the posted content data;
        send a notification to the recipient wireless communication device that the content data has been posted;
        set the password to be equal to a number different than a telephone number of the message origination wireless communication device; and
        send the password as part of the notification.

8. The system of claim 7, wherein the communication device is further configured to:
retrieve the number from a memory.

9. The system of claim 7, wherein the communication device is further configured to:
forward the content data to the recipient wireless communication device, without posting the content data on the website, based on the determination result.

* * * * *